United States Patent [19]

Wilks et al.

[11] Patent Number: 5,366,042
[45] Date of Patent: Nov. 22, 1994

[54] DEVICE FOR DETECTING DIFFERENT STEERING ANGLES

[75] Inventors: Eberhard Wilks, Hutthurm; Peter Sigl, Pocking; Manfred Ritzer, Thyrnau, all of Germany

[73] Assignee: ZF Friedrichshafen AG, Germany

[21] Appl. No.: 108,757

[22] PCT Filed: Mar. 4, 1992

[86] PCT No.: PCT/EP92/00486
    § 371 Date: Sep. 2, 1993
    § 102(e) Date: Sep. 2, 1993

[87] PCT Pub. No.: WO92/15842
    PCT Pub. Date: Sep. 17, 1992

[30] Foreign Application Priority Data

Mar. 6, 1991 [DE] Germany .................. 4107130

[51] Int. Cl.$^5$ ............................................. B60K 17/30
[52] U.S. Cl. .................................. 180/253; 280/96.1
[58] Field of Search .................. 280/96.1; 180/253; 250/231.13, 231.14, 231.18; 73/118.1

[56] References Cited

U.S. PATENT DOCUMENTS

| | | | |
|---|---|---|---|
| 4,775,026 | 10/1988 | Sollbach et al. | 180/249 |
| 4,841,808 | 6/1989 | Ouchi et al. | 180/249 |
| 5,004,915 | 4/1991 | Umehara et al. | 250/231.14 |
| 5,088,319 | 2/1992 | Hirose et al. | 73/118.1 |

FOREIGN PATENT DOCUMENTS

| | | |
|---|---|---|
| 0184997 | 6/1986 | European Pat. Off. . |
| 0227660 | 6/1988 | European Pat. Off. . |
| 0330632 | 8/1989 | European Pat. Off. . |
| 0384384 | 8/1990 | European Pat. Off. . |
| 2435379 | 4/1980 | France . |
| WO86/01467 | 3/1986 | WIPO . |

OTHER PUBLICATIONS

Patent Abstracts of Japan vol. 9, No. 334 (P-417) (2057) 27 Dec. 1985 & JP,A,60 158 313 (Toyota Jidosha K.K.) 19 Aug. 1985.

Primary Examiner—Karin L. Tyson
Assistant Examiner—Kevin Hurley
Attorney, Agent, or Firm—Davis, Bujold & Streck

[57] ABSTRACT

The invention concerns a device having an originator and a receiver unit (10, 11) and a signal-processing device (17) for detecting different steering angles. The device delivers switch signals, for instance, for actuating differential locks. For identifying discrete steering angles the originator unit (10) operates in conjunction with two sensors (12, 13). The proposed steering-angle sensory analysis is preferably used in axles of tractors and construction machines.

12 Claims, 2 Drawing Sheets

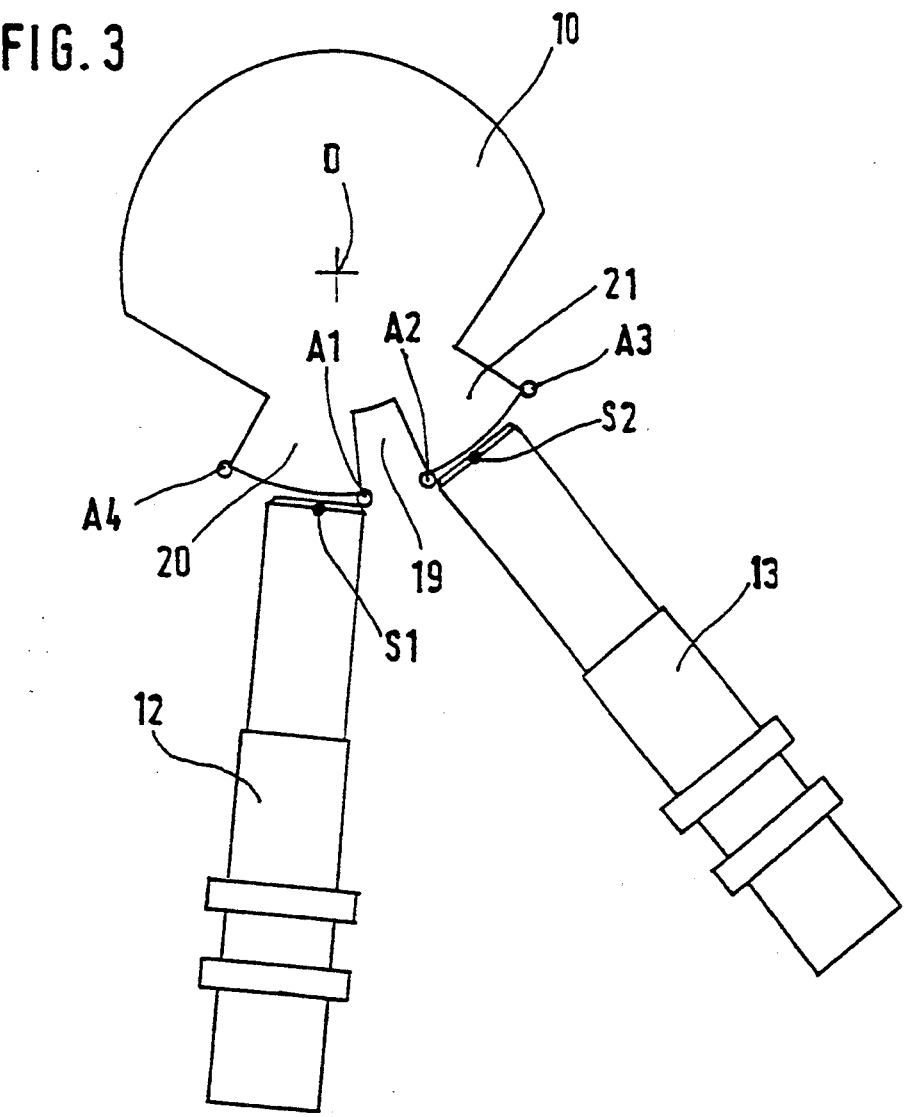

DEVICE FOR DETECTING DIFFERENT STEERING ANGLES

The invention concerns a device having an originator unit, a receiver unit, and a signal-processing unit for detecting different steering angles of a driven wheel of an axle for a motor vehicle.

EP-B1-02 27 660 has disclosed such a device provided for actuating a differential lock such as used, for instance, in farm tractors or construction vehicles. Since the driving devices of such vehicles are becoming increasingly complex, it is desirable to detect, starting from a straight-ahead drive position, limiting angles of different magnitudes for each steering direction of a wheel. This is one objective of the instant invention. In addition, the device must be simply built from structural and constructional points of view, and be capable of meeting the partly unfavorable conditions existing in practice.

The problem on which the invention is based is solved by the fact that the originator unit and two sensors, as a receiver unit, work in conjunction for identifying discrete steering angles of the wheel, and that based on the possible switch conditions of the sensors, switch signals are made available by means of which the signal-processing unit detects the steering angles in accordance with a magnitude and direction thereof. The proposed solution has the particular advantage that for each steering direction of the wheel, specific steering angles can be exactly detected by simple means so that depending on the necessities created by practice, for example, more than one differential lock can be actuated in the input traction of the vehicle depending on the steering angle. For instance, an arrangement is conceivable where, in the presence of a first (small) limiting steering angle, a transverse differential of a front axle is engaged or disengaged, while upon reaching another (larger) limiting steering angle, the differential lock of a longitudinal differential can be engaged. The expert will apply the proposed fundamental solution to similar problems.

An advantageous design of the originator unit is distinguished by having sectors with leading edges. The leading edges produce switch conditions of the sensors with which at least two discrete steering angles can be detected for each steering direction of the wheel.

During the production of the originator unit, it is possible, at a small expense, for the sensors to have three steering angles for each steering direction of the wheel. In this case, the originator unit has four leading edges.

A simple solution is obtained when the originator unit is formed by an axle kingpin.

The arrangement of the sensors can be accomplished in a simple manner by making them extend radially to an axis of rotation of the kingpin. For this purpose, the sensors are preferably situated adjacently in one plane and form an angle with each other. They are mounted in bores of an axle bridge, for instance, by screwing in a thread. Other possible manners of fastening are obviously available to the manufacturer.

For the manufacture and also for the operational safety of the device, it is advantageous to pass the connecting wires of the sensors into a common duct.

Since the sensors must be accessible from outside for servicing and adjustment purposes, it is advantageous to protect them from external influences by a detachable sealing cover.

In order to further protect the sensors against damage, it is advantageous to place them on the side of the axle bridge remote from a forward direction of travel.

A preferred embodiment of the originator unit distinguishes itself by the presence of three sectors. The central sector, based on a neutral or straight-ahead travel position, is formed by a groove. When it is desired that absolute amounts of the steering angles in the leading edges or the sectors can be advantageously designed in a manner such that the discrete steering angles for each steering direction of the wheel deviate from each other. An especially simple adaptation to the steering geometry can be obtained with said steps.

Other essential features for the invention, and the advantages resulting therefrom, are to be understood from the following description of an embodiment.

In the Drawings:

FIG. 3 is a topview diagrammatic reproduction of an originator and a receiver unit; and FIG. 4 is a tabular illustration of discrete steering angles depending on the possible switching conditions of the receiver unit.

Figure 1:
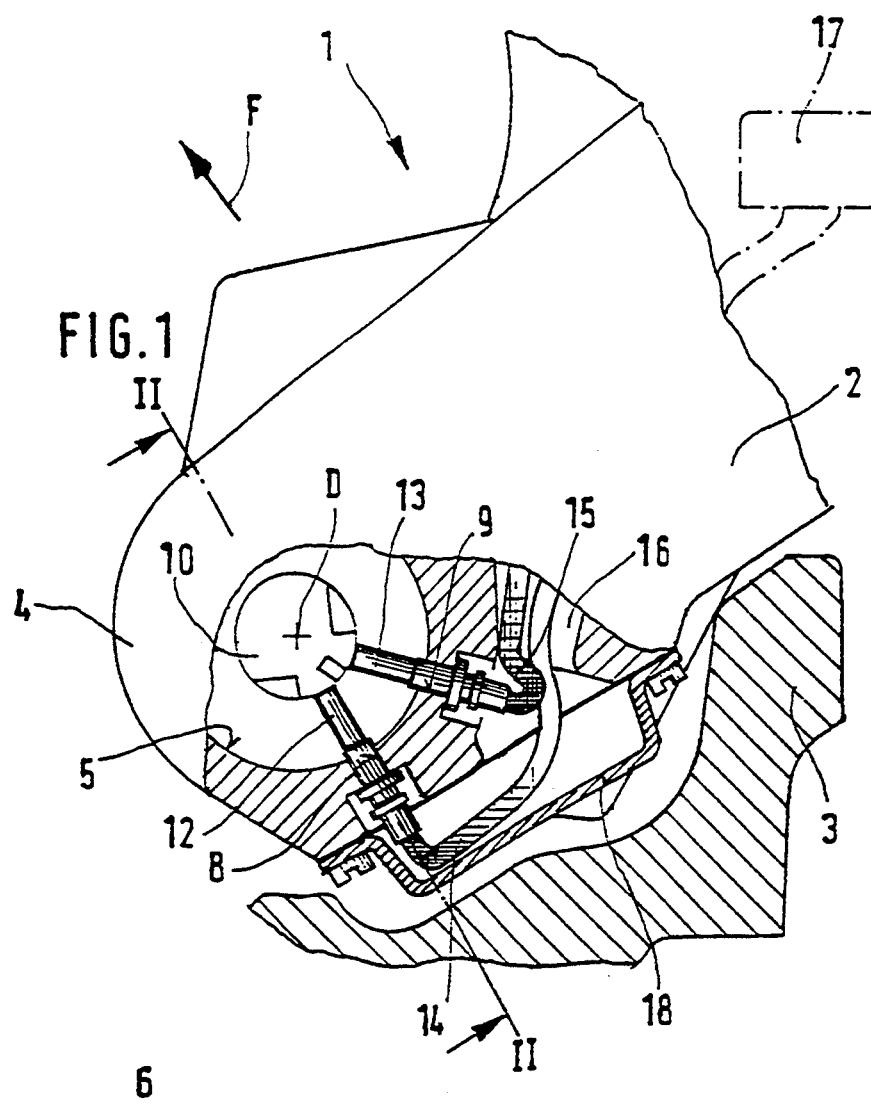
FIG. 1 is a partial, greatly simplified, topview of one axle of a motor vehicle specifically in the area of a steered wheel.

A diagrammatic reproduction, partly cut away, topview of the left, external portion of an axle 1 of a motor vehicle such as a tractor is shown in FIG. 1. The direction of travel is designated with the arrow F.

The axle 1 consists of an axle bridge 2 in which, in particular, an axle half shaft not shown is supported. A pivot housing 3, on which a likewise not shown wheel is rotatably supported, is merely indicated and tiltably situated about an axis of rotation D. Part of the pivot housing 3 is shown in a terminal position which corresponds to a left turn with the smallest turning radius.

The area to be seen as partially cut away in FIG. 1 is part of the upper leg 4 of the fork-like end of the axle bridge 2. A blind bore 5 can be seen which serves mainly for supporting an axle kingpin 6. The axle kingpin 6 is a component of the pivot housing 3 and rotates therewith around the axis of rotation D. For this purpose, the axle kingpin 6, as can be seen in FIG. 2, is supported on a tapered roller bearing 7 in the top leg 4 of the axle bridge 2.

On the side of the axle bridge 2, remote from the forward direction of travel F, are two bores 8 and 9 in the top leg 4. The bores 8 and 9 lie in a horizontal plane and are radially oriented with respect to the axis of rotation D.

Different steering angles are detected by the interaction of an originator unit 10 with a receiver unit 11 and a signal-processing unit 17 which is only diagrammatically indicated.

Figure 2:
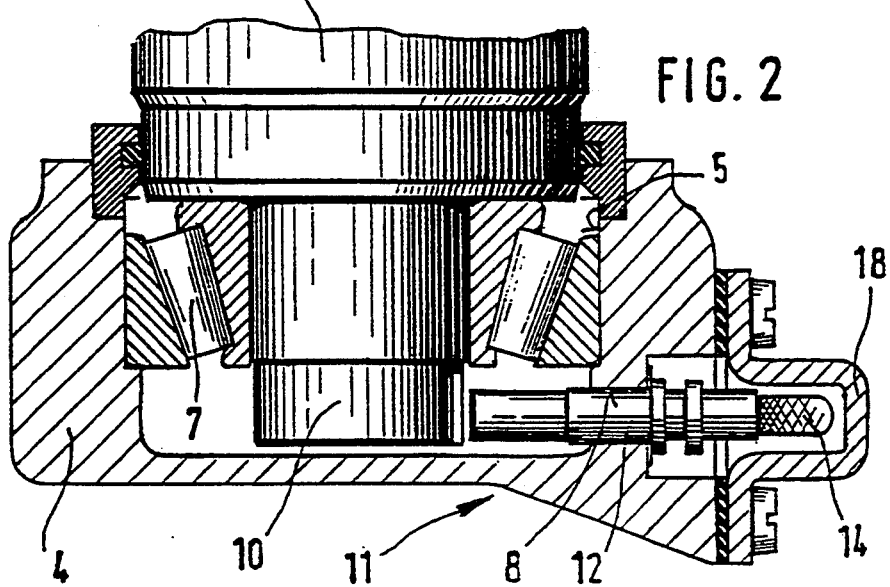
FIG. 2 is a detail in cross section of the arrangement of FIG. 1 along line II—II of FIG. 1.

In the described embodiment of the invention, the originator unit itself is formed by the axle kingpin 6 (FIG. 2). The receiver unit 11 is composed of two sensors 12 and 13 which are inserted in the bores 8 and 9. Connecting wires 14 and 15 are housed together in a duct 16 of the axle bridge 2 and connected with the signal-processing device 17.

Since the sensors 12 and 13 must be accessible for assembly and adjustment purposes, a detachable sealing cover 18 is provided which protects the sensors 12 and 13 from external influences. In the diagrammatic drawing according to FIG. 3, a further development of the originator unit 10 and the interaction thereof with the receiver unit 11 formed by the sensors 12 and 13 can be seen.

The originator unit has all together four leading edges A1, A2, A3 and A4. The leading edges A1 to A4 define three sectors of the originator unit 10, of which, the central sector is formed by a groove 19 and the two adjacent sectors by webs 20 and 21. To make the coordination of the leading edges A1 to A4 with the sensors 12 and 13 intelligible, the switch points of the sensors 12 and 13 are designated as S1 and S2.

For identifying discrete steering angles, the originator unit 10, with the leading edges A1 to A4, For identifying discrete steering angles, the originator unit 10, with the leading edges A1 to A4, operate in conjunction with the two sensors 12 and 13, and the switching points S1 thereof, as the receiver unit 11. The possible switching conditions of the sensors are designated with I or O. FIG. 4 contains a tabular synopsis of the switching conditions of the sensors 12 and 13 depending on specific discrete steering angles $\alpha 1$, $\alpha 2$, $\alpha 3$, $\alpha 4$, $\alpha 5$ and $\alpha 6$ which occur when making a left or right turn. Based on the switching conditions, the signal-processing device can identify each one of the discrete steering angles $\alpha 1$ to $\alpha 6$ according to their magnitude and direction. The discrete steering angles $\alpha 1$ to $\alpha 6$, mentioned below or seen from the table of FIG. 4, are to be interpreted as examples.

Discrete steering angles $\alpha 1$, $\alpha 3$ and $\alpha 5$ of 15°, 25° and 30° occur when making a left turn. It must be added for clarification that the originator unit 10, when making a left turn, is rotated counterclockwise around the axis of rotation D. $\alpha 1$ is reached when the leading edge A2 is opposite the switch point S2. At $\alpha 3$, the leading edge A4 is opposite the switch point S1. A steering angle $\alpha 5$ of 30° is detected when the leading edge A1 is opposite the switch point S2 of the sensor 13.

When making a right turn, where the originator unit 10 is rotated clockwise around the axis of rotation D, the following conditions appear:

The steering angle $\alpha 2$ of 14° is present when the leading edge A1 has reached the switch point S1. $\alpha 4$, that is a steering angle of 22°, means that the leading edge A3 is opposite the switch point S2. A steering angle $\alpha 6$ of 29°, is reached when the leading edge A2 is opposite the switch point S1.

The respective switch conditions of the sensors 12 and 13, based on the indicated discrete steering angles $\alpha 1$ to $\alpha 6$, are to be understood from the table of FIG. 4. understood that the discrete steering angles $\alpha 1$ to $\alpha 6$ can be respectively varied in a simple manner.

REFERENCE NUMERALS 1 axle
2 axle bridge
3 pivot housing
4 upper leg
5 blind bore
6 axle kingpin
7 tapered roller bearing
8 bore
9 bore
10 originator unit
11 receiver unit
12 sensor
13 sensor
14 connecting wire
15 connecting wire
16 duct
17 signal-processing unit
18 sealing cover
19 groove
20 web
21 web

We claim:

1. A detection device for detecting discrete steering angle of a wheel, said device comprising:
   an originator unit;
   a receiver unit (11) interacting with said originator unit, said receiver unit comprising two sensors (12, 13); and
   a signal-processing unit (17), communicating with said receiver unit (11), for determining different steering angles of a driven wheel of an axle for a motor vehicle;
   wherein said originator unit (10) and said two sensors (12, 13) operate in conjunction with one another for identifying a discrete steering angle ($\alpha 1$ to $\alpha 6$) of the wheel and, based upon the possible switch conditions (I, O) of said sensors (12, 13), said signal-processing unit (17) detects the discrete steering angles ($\alpha 1$ to $\alpha 6$) according to a direction and a magnitude of the steering angle and, when the wheel is located in a straight-ahead travel position and said two sensors are activated, said two sensors (12, 13) are positioned adjacent a web portion of said originator unit (10) and generate an identical switch condition (I or O).

2. A device according to the claim 1, wherein said originator unit (10) has a plurality of sectors (19, 20, 21) with leading edges (A1 to A4) which produce said switch conditions (I, O) of said sensors (12, 13), and at least two discrete steering angles ($\alpha 1$ to $\alpha 6$) are detectable for each direction of rotation of the wheel from a straight-ahead travel position.

3. A device according to claim 2, wherein said originator unit (10) has four leading edges (A1 to A4) in which three discrete steering angles ($\alpha 1$ to $\alpha 6$) are detectable for each direction of rotation of the wheel from a straight-ahead travel position.

4. A device according to claim 1, wherein said originator unit (10) comprises an axle kingpin (6).

5. A device according to claim 4, wherein said sensors (12, 13) extend radially with respect to an axis of rotation (D) of said axle kingpin (6).

6. A device according to claim 4, wherein said sensors are assembled, in one plane, adjacent one another in bores (8, 9) of an axle bridge (2) and said sensors form an angle with respect to one another.

7. A device according to claim 2, wherein said originator unit (10) includes three serially arranged sectors (19, 20, 21) and the central sector is formed by a groove (19).

8. A device according to claim 7, wherein at least one of said leading edges (A1 to A4) and said three sectors (19, 20, 21) is designed in a manner such that the discrete steering angles ($\alpha 1$ to $\alpha 6$) deviate from one another for each steering direction of the wheel.

9. A device according to the claim 1, wherein said two sensors, when activated, generate identical switch conditions (I or O), as the switch condition (I or O) generated when the wheel is located in a straight-ahead travel position, only for a single desired contiguous steering angle range during a right-hand turn and for a single desired contiguous steering angle range during a left-hand turn.

10. A detection device for detecting discrete steering angle of a wheel, said device comprising:
   an originator unit;
   a receiver unit (11) interacting with said originator unit, said receiver unit comprising two sensors (12, 13); and
   a signal-processing unit (17), communicating with said receiver unit (11), for determining different steering angles of a driven wheel of an axle for a motor vehicle;
   wherein said originator unit (10) and said two sensors (12, 13) operate in conjunction with one another for identifying a discrete steering angle ($\alpha 1$ to $\alpha 6$) of the wheel and, based upon the possible switch conditions (I, O) of said sensors (12, 13), said signal-processing unit (17) detects the discrete steering angles ($\alpha 1$ to $\alpha 6$) according to a direction and a magnitude of the steering angle, said sensors are assembled in bores (8, 9) of an axle bridge (2), and connecting wires (14, 15), interconnected with said sensors (12, 13), are located within a common duct (16) of said axle bridge (2).

11. A detection device for detecting discrete steering angle of a wheel, said device comprising:
   an originator unit;
   a receiver unit (11) interacting with said originator unit, said receiver unit comprising two sensors (12, 13); and
   a signal-processing unit (17), communicating with said receiver unit (11), for determining different steering angles of a driven wheel of an axle for a motor vehicle;
   wherein said originator unit (10) and said two sensors (12, 13) operate in conjunction with one another for identifying a discrete steering angle ($\alpha 1$ to $\alpha 6$) of the wheel and, based upon the possible switch conditions (I, O) of said sensors (12, 13), said signal-processing unit (17) detects the discrete steering angles ($\alpha 1$ to $\alpha 6$) according to a direction and a magnitude of the steering angle, and said sensors (12, 13) are protected from an external environmental influence by a detachable sealing cover.

12. A device according to claim 11, wherein said sensors (12, 13) are situated on a side of an axle bridge (2) remote from a forward direction of travel (F).

* * * * *